Dec. 29, 1925.
E. R. WAGNER
PEDAL
Filed April 9, 1923
1,567,775
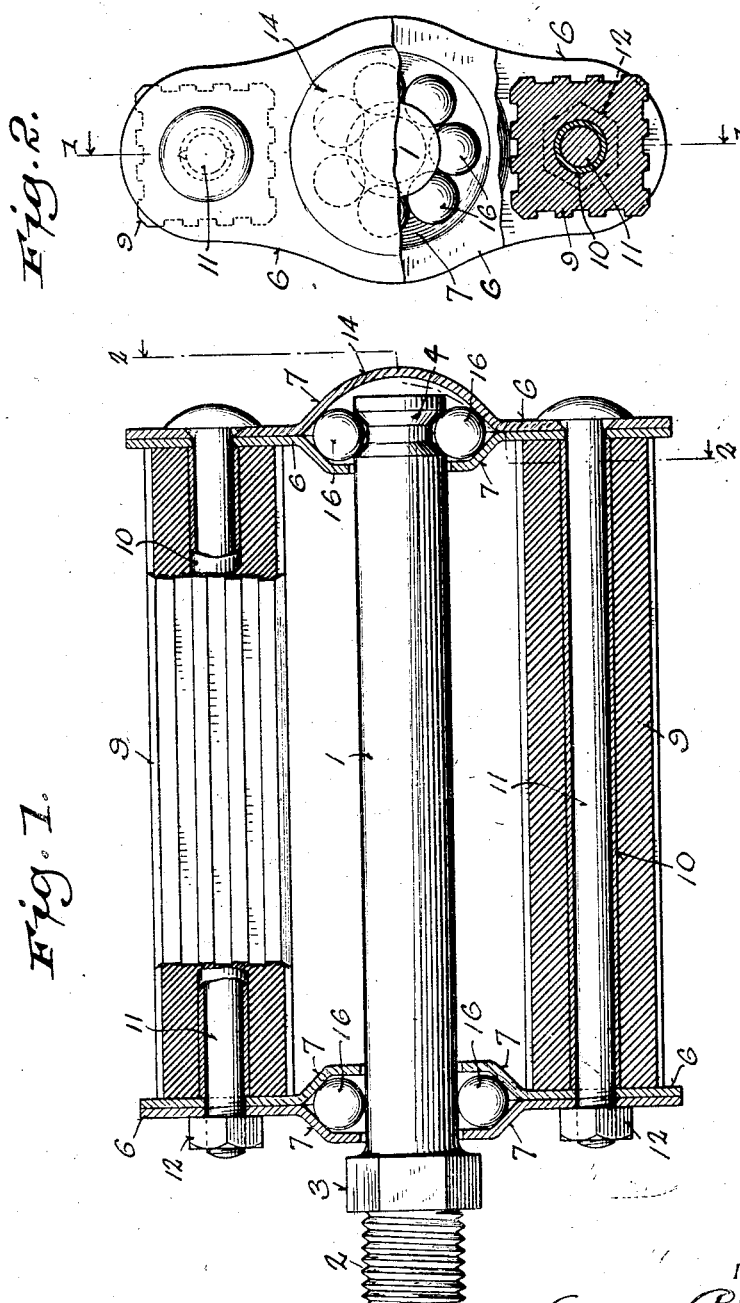
INVENTOR:
Edward R. Wagner,
BY
Bottum, Hudnall, Lecher & McNamara
ATTORNEYS.

Patented Dec. 29, 1925.

1,567,775

UNITED STATES PATENT OFFICE.

EDWARD R. WAGNER, OF MILWAUKEE, WISCONSIN, ASSIGNOR TO E. R. WAGNER MANUFACTURING COMPANY, OF NORTH MILWAUKEE, WISCONSIN, A CORPORATION OF WISCONSIN.

PEDAL.

Application filed April 9, 1923. Serial No. 630,741.

*To all whom it may concern:*

Be it known that I, EDWARD R. WAGNER, a citizen of the United States, residing at Milwaukee, in the county of Milwaukee and State of Wisconsin, have invented certain new and useful Improvements in Pedals, of which the following is a specification, reference being had to the accompanying drawing, forming a part thereof.

This invention relates to pedals for motorcycles, bicycles, velocipedes and the like.

Its main object is to simplify and improve the construction and facilitate the assemblage and repair of pedals of this class.

It consists in the construction, arrangement and combination of parts as hereinafter particularly described and pointed out in the claims.

In the accompanying drawing like characters designate the same parts in both figures.

Figure 1 is a partial central longitudinal section on the line 1—1, Fig. 2, of a pedal embodying the invention; and Fig. 2 is an end elevation and partial cross section on the line 2—2, Fig. 1, of the pedal.

The pedal in its preferred embodiment comprises a crank pin or spindle 1, formed at one end with a screwthread 2 and polygonal head 3, for fastening it to the crank arm of a motorcycle, bicycle, velocipede or the like, in the usual way.

Adjacent its other or free end the spindle is provided with a circumferential groove forming a ball race 4, having sides or bearing faces converging towards the axis of the spindle.

The end members of the pedal are each composed of two plates 6, placed face to face and provided around the center with divergent bearings 7, forming ball races. Adjacent their ends the plates 6 of each end member are formed with registering holes.

Two foot pieces or treads 9, shown as provided with axial spacing and supporting tubes or bushings 10, are mounted between the end members on tie bolts or rods 11, passing through the registering holes in the plates 6 and through the tubes 10, which abut at their ends against the inner plates and in effect form shoulders on the bolts or rods adjacent their ends for clamping and holding the plates tightly together.

The bolts or rods 11 are shown as formed with heads at one end and as threaded and provided with nuts 12 at the other end, for binding or tying the parts of the pedal together and holding the treads in place.

The treads 9, which are made of rubber or other elastic or fibrous material, providing an effective foothold for a rider, are preferably square or four-sided, and have corrugated or ribbed faces as shown, to increase frictional engagement with the boot or shoe soles of the rider. Either two opposite faces of each tread may be adjusted to and secured in operative position by loosening and tightening the nuts 12 on the tie bolts 11, thereby distributing wear on the treads and extending their life.

The two plates 6 of the inner end member and the inner plate of the outer end member of the pedal, are formed with central holes concentric with the ball bearings 7, to receive and clear the spindle 1.

The outer plate 6 of the outer end member is preferably extended outwardly from its annular ball bearing 7, and forms a cap or closure 14, which covers and shields the outer grooved end of the spindle 1, protects the ball bearings and balls at that end of the spindle against dirt and dust, and improves the appearance of the pedal.

The parts of the pedal are assembled with balls 16 interposed between the bearings 7 of the end members and the spindle 1.

The ball race formed by the plates 6 at the outer end of the pedal is of smaller diameter than the ball race formed by the plates 6 at the inner end of the pedal, so that the balls 16 in the outer end of the pedal engage with the groove or race 4 of the spindle 1, and retain the pedal in place on the spindle.

By removing the bolts 11 or partially withdrawing them, the parts of the pedal may be separated and defective parts easily renewed, and by loosening the nuts 12 on the bolts, the treads 9 may be turned to bring different faces into operative position and then fastened in place by tightening the nuts.

Various modifications in the construction and arrangement of parts of the pedal may be made without departure from the principle and scope of the invention as defined in the following claims.

I claim:

1. A pedal comprising end members each composed of two plates assembled face to face and forming an annular ball race, treads arranged parallel with and on opposite sides of the pedal axis between the end members, and tie rods passing through the end members and treads and binding the parts of the pedal together.

2. A pedal comprising end members each composed of two plates and forming central axially aligned ball races, treads arranged on opposite sides of the pedal axis between the end members, tie rods passing through the end members to bind the parts of the pedal together, and means cooperating with said tie rods to hold said end members in spaced relation.

3. A pedal comprising end members each composed of two plates forming axially aligned annular ball races, elastic polyhedral treads arranged on opposite sides of the pedal axis between the end members, metal bushings passing longitudinally through the treads and abutting at the ends against the end members, and tie rods passing through the end members and intervening bushings and binding the parts of the pedal together.

4. A pedal comprising end members each composed of two plates placed face to face and formed adjacent their ends with registering holes and between their ends with oppositely bent annular ball bearings, treads arranged on opposite sides of and parallel with the pedal axis between the end members, and tie rods passing through the holes in the end members and longitudinally through the treads and binding the parts of the pedal together.

5. A pedal comprising a spindle having a circumferential groove forming a ball race adjacent its free end, end members each composed of two plates forming an annular ball race, balls interposed between the spindle and the ball races of the end members, the balls at the outer end of the pedal engaging the groove in the spindle and confining the pedal on the spindle, treads arranged on opposite sides of and parallel with the spindle between the end members, and rods passing through the component plates of the end members and the intervening treads and fastening the several parts of the pedal together.

6. A pedal comprising a spindle having a circumferential groove forming a ball race adjacent one end, an end member having a ball race surrounding the race in the spindle, and balls interposed between and projecting outwardly and inwardly into said races to hold the pedal on the spindle.

7. A pedal comprising a spindle having a circumferential groove forming a ball race, an end member having a ball race surrounding the ball race in the spindle and composed of separable parts, and balls interposed between and engaging said races and confining the pedal on the spindle.

8. A pedal comprising a spindle having a circumferential groove forming a ball race adjacent one end, end members each composed of two plates bent away from each other around the center and forming an annular ball race, balls interposed between the spindle and the races of the end members, both plates of one end member and the inner plate of the other end member having central holes through which the spindle passes, and the central outwardly bent portion of the outer plate of the end member next to the grooved end of the spindle forming a closure over the free end of the spindle, treads arranged on opposite sides of and parallel with the spindle, and tie rods passing through the component plates of the end members and the treads and binding the parts of the pedal together.

9. In a pedal, a spindle having one end thereof adapted for attachment to a crank and the other end provided with a circumferential groove, a pair of similar plates fitted together and loosely mounted on said spindle at the crank end thereof, the respective portions of said plates at said spindle being bent outwardly and away from each other to form a ball race, a plurality of balls arranged in said ball race and held thereby in engagement with said spindle whereby said plates are held in spaced relation with respect to said spindle and permitted to rotate freely about the latter, a second pair of similar plates fitted together and arranged at said other end of said spindle, the central portions of said second pair of plates being bent outwardly and away from each other to form with said circumferential groove a ball race, a plurality of balls arranged in said last-mentioned ball race and adapted to hold said second pair of plates in spaced relation with respect to said spindle for free rotation about the same and to coact with the sides of said groove to prevent axial movement of said second pair of plates with respect to said spindle, the central portion of one of said second pair of plates extending over and providing a closure for said last-mentioned end of said spindle, and tread members arranged between said pairs of plates and adapted to connect the same for rotation together about said spindle and to hold said pairs of plates in fixed spaced relation with respect to each other.

In witness whereof I hereto affix my signature.

EDWARD R. WAGNER.